(No Model.)

F. G. HIGH.
STOVE AND KITCHEN UTENSIL.

No. 540,548. Patented June 4, 1895.

Witnesses,

Inventor,
Frank G. High
By Dewey & Co
Attys

THE NORRIS PETERS CO., PHOTO-LITHO., WASHINGTON, D. C.

United States Patent Office.

FRANK G. HIGH, OF SAN FRANCISCO, CALIFORNIA.

STOVE AND KITCHEN UTENSIL.

SPECIFICATION forming part of Letters Patent No. 540,548, dated June 4, 1895.

Application filed March 4, 1895. Serial No. 540,518. (No model.)

*To all whom it may concern:*

Be it known that I, FRANK G. HIGH, a citizen of the United States, residing in the city and county of San Francisco, State of California, have invented an Improvement in Stove and Kitchen Utensils; and I hereby declare the following to be a full, clear, and exact description of the same.

My invention relates to a device embodying in one utensil a variety of functions.

It consists in certain details of construction which will be more fully explained by reference to the accompanying drawings, in which—

Figure 1:
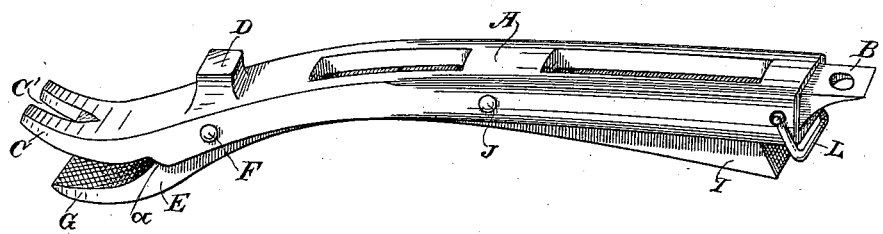
Figure 2:
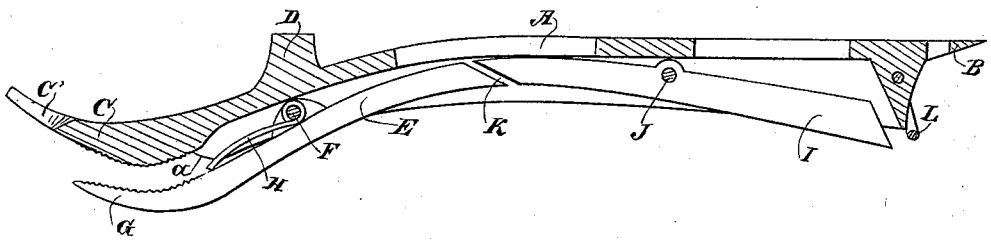

Figure 1 is an exterior perspective view of of the tool. Fig. 2 is a longitudinal section.

The object of my invention is to provide a device which is variously useful as a stove-lid lifter, a lifter for pans or other articles where it can be made to grasp the edge, together with a scraper, a hammer and means for extracting tacks or nails.

A is the body of the lifter which consists of a handle of sufficient length to be conveniently grasped. This handle may be made of any desired shape, as rectangular or semi-cylindrical on the upper surface, the lower surface being made hollow as shown, for lightness and to admit of the attachment of the other parts. It also serves for a circulation of air to keep it cool when in use about a stove, and to allow it to be kept clear of dirt. At one end of this handle is formed a projecting sharpened edge B which serves for scraping the insides of pots or pans, or to scrape sticky matter or dirt from the stove. The other end is curved reversely from the curvature of the body, and is at the same time tapered to a point as shown at C, this point being thin enough to enter the opening usually made in stove lids, so that it may be introduced and used for the purpose of lifting the lid. This point may also be formed with a notch C′ which will enable it to be used to extract tacks and nails if desired. Just behind this lifting portion C is formed a projection D which on occasion may be used as a hammer for driving tacks or nails. Beneath this projection, in the hollowed out portion of the handle A, is fulcrumed a lever arm E, turning or swiveling upon a pin F which passes through the sides of the handle portion and through a lug formed upon the part E about midway of its length.

The front end of the lever E is curved upwardly as shown at G so as to correspond in shape with the lower part of the curved portion C of the handle, and the two adjacent surfaces; that is, the lower part of the point C and the upper part of the point G are preferably corrugated or roughened so that when closed toward each other, they may grasp the edge of any hot metal vessel which it is desired to lift from the stove, or to grasp any object which can be conveniently taken hold of by this device.

The part G is shorter than the part C, and the curvature of the two is such that the handle should be reversed or turned over for this purpose. This will bring the jaw G inside and the point C outside of the article to be grasped.

A spring H is coiled about the fulcrum pin F, and acts upon the lever arm E so as to normally hold the jaws G and C separated from each other. In order to close these jaws I have shown a lever I fulcrumed upon a pin J about midway of its length, extending from the sides to the hollowed out portion of the handle A behind the lever E. The two adjacent ends of the levers E and I are beveled and overlap each other as shown at K, so that in their normal positions, the action of the spring H throws the jaw G downward and the opposite end of the lever E upward into the channel in the lower part of the handle. This acting upon the forward end of the lever I also throws that upward into the channel and correspondingly depresses the opposite end of the lever I so that it normally projects below the handle A.

When the device is to be used as a stove-lid lifter, or for a similar purpose, the handle being grasped by the hand of the operator, when the hand is closed, the pressure upon the lever I forces the rear end of it into the open channel in the handle A and correspondingly depresses or forces out the opposite end. This end engaging the rear end of the lever E, by reason of the beveled overlapping connection between the two, will immediately close the part G against the part C, thus leaving an approximately common line of curvature along the lower part of the points C and G. This makes the point of considerable greater stiffness by uniting the two into one and is of especial value when used for drawing nails. The lower part G also serves as a fulcrum about which the claw or point C turns for this purpose, when the handle A is pressed down.

If the device is to be used for grasping and lifting any other article, the edge of the article is first inserted between the points C and G, after turning the handle over, and then by grasping the handle, the two are closed so as to grip the edge of the article to be lifted with any degree of pressure sufficient to hold it, the corrugated meeting faces preventing its slipping or turning.

The shoulder a prevents any thin edge to be grasped, from slipping back too far.

If it is desired to retain the points C and G in a closed condition, it is done by means of the swinging link L which is fulcrumed to the handle A, as shown at M, so that when the lever I has been closed into the handle A, the link may be turned beneath the lever I and thus hold it in position, in which case the two points G and C remain closed together.

The device forms an exceedingly useful kitchen utensil serviceable for many purposes.

Having thus described my invention, what I claim as new, and desire to secure by Letters Patent, is—

1. A utensil consisting of the hollow handle having a curved projecting point at one end, a lever fulcrumed to the lower front portion of the handle having a correspondingly curved point adapted to close and fit the lower surface of the first named point, said curved portions having their adjacent surfaces formed as gripping faces, a second lever fulcrumed behind the first one connected therewith so that when the handle is grasped it will act to close the front end of the forward lever against the front tip or point of the handle, said levers being contained within the hollow of the handle portion.

2. A utensil consisting of a curved handle, channeled or made hollow upon the under side and having the front curved and tapered to a point or edge, a lever centrally fulcrumed in the channel beneath the front portion of the handle having a tip corresponding in shape with the tip at the front of the handle, and adapted to close against it, a spring by which this point is normally held away so as to leave an open channel between the two, a second lever fulcrumed midway of its length in the channel in the handle behind the first lever, the ends of the two levers being beveled or overlapping, as shown, whereby pressure upon the rear end of the second lever will act through the first one to close the points or tips together.

3. A utensil consisting of a curved handle channeled or chambered on the lower side having an upwardly curved tip or point, levers fulcrumed in the channel beneath the handle having beveled overlapping meeting ends, a tip formed upon the front end of the forward lever with a corrugated face, corresponding with the corrugated lower surface of the tip of the handle and adapted to be closed against it by pressure upon the rear end of the rearmost lever, a spring by which the tips are normally held separate from each other with the rear end of the rearmost lever projecting from the channel in the handle, and a swinging loop fulcrumed to the rear of the handle adapted to engage the rear of the rearmost lever to retain it within the handle when the tips of the levers are closed together.

4. A utensil consisting of a handle having a curved bifurcated tip at the front, an upward projection formed behind the tip and a wedge-shaped projection from the rear end with a groove or channel extending longitudinally along the lower side of said handle, levers fulcrumed midway of their lengths, one behind the other, within the channel of the handle and having their adjacent ends beveled and overlapping, a curved tip formed upon the front end of the forward lever corresponding in shape to the lower portion of the handle tip and adapted to be closed against it, a spring acting to normally hold the lever tip away from the handle tip and leave an opening between the two for grasping articles, and a swinging link pivoted to the rearmost end of the handle adapted to swing beneath the end of the rearmost lever so as to close it into the handle and close the tips or jaws at the front end to form a single continuous tip.

5. A utensil consisting of a hollow handle having a curved bifurcated tip at the front end, levers contained within the hollow of the handle, and fulcrumed, one behind the other with the adjacent ends adapted to engage, a curved tip formed on the forward lever of less length than that of the handle and adapted to be closed against it from below, the lower part thereof forming a fulcrum about which the handle tip is movable.

In witness whereof I have hereunto set my hand.

FRANK G. HIGH.

Witnesses:
S. H. NOURSE,
JESSIE C. BRODIE.